T. J. SHEA.
MAGNETIC DOLLY BAR.
APPLICATION FILED SEPT. 11, 1918.

1,302,978.

Patented May 6, 1919.

Inventor
Thomas J. Shea
By Geo. E. Tew
Attorney

UNITED STATES PATENT OFFICE.

THOMAS J. SHEA, OF PORTLAND, OREGON.

MAGNETIC DOLLY-BAR.

1,302,978.     Specification of Letters Patent.     Patented May 6, 1919.

Application filed September 11, 1918. Serial No. 253,553.

*To all whom it may concern:*

Be it known that I, THOMAS J. SHEA, a citizen of the United States, residing at Portland, in the county of Multnomah and State of Oregon, have invented certain new and useful Improvements in Magnetic Dolly-Bars, of which the following is a specification.

This invention relates to magnetic dolly bars for use in riveting, and with certain modifications it is applicable to magnetic devices for heating and compressing rivets in place, or for spot welding metal plates.

The object of the invention is to produce an improved device of this kind, and in its application to dollies or rivet holding bars, it has the effect of fastening or holding the device against the plates and the rivet while the rivet is being headed.

It will be found particularly useful in ship-building, where the plates are large, as the device can be readily located in any desired position on one side of the plates and will by magnetic attraction hold itself there while the rivet is being set, without other or external supporting means.

Figure 1:
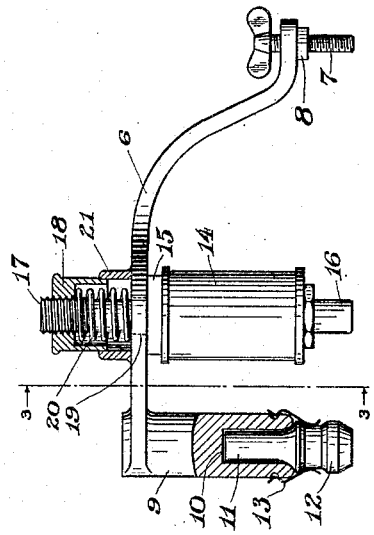
Figure 2:
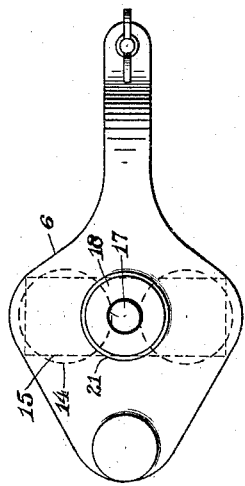
Figure 4:
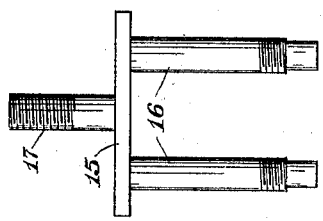
Figure 3:
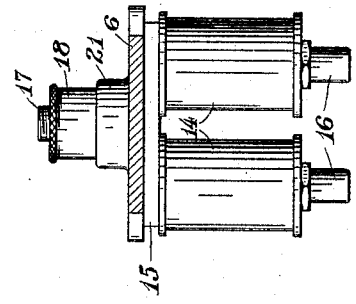

One form of the invention is illustrated in the accompanying drawings in which Figure 1 is a side elevation of the device, partly in section. Fig. 2 is a top plan view. Fig. 3 is a section on the line 3—3 of Fig. 1. Fig. 4 is a detail of the magnet yoke.

The invention involves or includes a new principle of a frame having the function of a lever one end of which is fulcrumed on or against the plate or work and the other end of which carries a rivet set, together with a magnet, and a spring in compression between the magnet and the lever, to hold the latter to the work, the magnet fastening itself to the work by its attraction when energized.

In the present embodiment of this idea, as indicated in the drawings, 6 indicates the main frame which constitutes in effect a lever. At one end of the frame is a screw post 7 which may be fixed at adjustment by a locking nut 8, this post resting against the face of the work, being adjustable to accommodate the device to lapped plates or the like, to bring the rivet set in the proper plane. At the other end of the frame is a head 9 having a bore 10 to receive the shank 11 of a standard rivet set 12, which is held in the head by spring clips 13. Sets of various sizes can be used according to the kind of work. The main frame of the device is bowed upwardly or outwardly from the plane of the work to afford a recess for the magnets.

In one form of the invention I use a double magnet, as shown, the coils being indicated at 14 and the yoke at 15 to which cores 16 of the magnet are attached. The yoke has a stem 17 which is threaded to receive a cap 18, and the stem extends loosely through a hole at 19 in the crown of the frame. A spring 20 is coiled around the stem in compression between the cap and the back of the frame, and the cap works freely within a chambered boss 21 on the back of the frame.

Although two coils are shown, a magnet with a single coil can be used if desired. When two coils are used, the frame is preferably widened, as shown in Fig. 2, to cover the yoke thereunder.

When the device as described is applied to the work, and the magnet is energized, its cores by magnetic attraction attach themselves to the work or the plates, with the fulcrum pin 7 resting against the plates at one end, and the rivet set 12 being clamped against the rivet at the other end of the frame, and this action compresses somewhat the spring 21 so that the rivet set is held by spring pressure against the rivet. If, now, the riveting tool is applied to the other end of the rivet, the impact shocks will be taken up or absorbed by the spring, the frame acting as a lever pressed toward the work by the attraction of the magnet transmitted through the spring. The magnet, therefore, is not disturbed, but continues to hold the device in place while the riveting is being effected, but as soon as the magnet is deënergized the device releases and may be moved to the next position. The tension of the spring 20 can be regulated by adjustment of the cap 18 so as to vary the pressure.

The magnet is shown inside of the rivet set, that is, between the rivet and the fulcrum pin, which is a most convenient arrangement, but if desired, the magnet can be set outside of the rivet set, that is, the positions of the rivet set and the magnet may be interchanged.

I claim:

1. In a rivet holder or dolly, the combination of a lever frame adapted to automatically press against the work and having a rivet set adapted to be held against the rivet, a magnet acting when energized to hold the device to the work, and a spring between the magnet and the frame.

2. In a rivet holder or dolly, the combination of a lever frame adapted to automatically press against the work and provided with a device to engage the rivet, a holding magnet, and a spring in compression between the magnet and the frame.

3. In a rivet holder or dolly, the combination of a lever adapted to be fulcrumed at one end of the work and having a device at the other end to engage a rivet, a holding magnet, and a spring connection between the magnet and the lever permitting vibrations of the lever without disturbing the magnet.

4. In a rivet holder or dolly, the combination of a frame having a device adapted to engage a rivet, a holding magnet adapted to be applied to the work, and a yielding connection between the magnet and said frame to hold said device against the rivet with a yielding pressure.

5. In a rivet holder or dolly, the combination of a lever frame adapted to automatically press against the work and having a rivet engaging device, a holding magnet having a stem extending through the lever, and a spring in compression between said stem and the lever, to hold the device against the rivet with a yielding pressure.

6. In a rivet holder or dolly, the combination of a lever, an adjustable fulcrum pin at one end of the lever, a rivet engaging device carried by the lever, and magnetic means to hold the lever to the work.

In testimony whereof, I affix my signature in presence of two witnesses.

THOMAS J. SHEA.

Witnesses:
  FRANK BALLAM,
  GLENDORA S. THOMPSON.

Copies of this patent may be obtained for five cents each, by addressing the "Commissioner of Patents, Washington, D. C."